United States Patent
Senellart et al.

(10) Patent No.: US 9,075,283 B2
(45) Date of Patent: Jul. 7, 2015

(54) POLARIZATION-ENTANGLED PHOTON PAIR SOURCE AND METHOD FOR THE MANUFACTURE THEREOF

(75) Inventors: Pascale Senellart, Orsay (FR); Adrien Dousse, North Point (HK)

(73) Assignee: CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 13/522,982

(22) PCT Filed: Jan. 14, 2011

(86) PCT No.: PCT/FR2011/000021
§ 371 (c)(1),
(2), (4) Date: Nov. 14, 2012

(87) PCT Pub. No.: WO2011/089336
PCT Pub. Date: Jul. 28, 2011

(65) Prior Publication Data
US 2013/0048845 A1   Feb. 28, 2013

(30) Foreign Application Priority Data
Jan. 19, 2010   (FR) ..................... 10 00195

(51) Int. Cl.
*H01L 33/06*   (2010.01)
*G02F 1/35*    (2006.01)
*B82Y 20/00*   (2011.01)
*H04L 9/08*    (2006.01)
*G02F 1/015*   (2006.01)

(52) U.S. Cl.
CPC .............. *G02F 1/3526* (2013.01); *H01L 33/06* (2013.01); *B82Y 20/00* (2013.01); *G02F 2001/0157* (2013.01); *H04L 9/0858* (2013.01)

(58) Field of Classification Search
CPC ......................................... H01L 33/06
See application file for complete search history.

(56) References Cited

PUBLICATIONS

Stace et al., "Entangled Two-Photon Source Using Biexciton Emission of an Asymmetric Quantum Dot in a Cavity", Physical Review B 67, 085317 (2003).*
Bayer et al., "Optical Modes in Photonic Molecules", Physical Review Letters, vol. 81, No. 12, (Sep. 21, 1998).*
Dousse et al., "Controlled Light-Matter Coupling for a Single Quantum Dot Embedded in a Pillar Microcavity Using Far-Field Optical Lithography", Physical Review Letters 101, 267404 (2008).*

(Continued)

*Primary Examiner* — Jack Berman
*Assistant Examiner* — James Choi
(74) *Attorney, Agent, or Firm* — Oblon, McClelland, Maier & Neustadt, L.L.P.

(57) ABSTRACT

An entangled photon pair source including: a quantum emitter having a ground state, two degenerate states that have one elementary excitation and different spins, and a state having two elementary excitations; a first optical cavity, wherein the quantum emitter is inserted; and a second optical cavity coupled with the first cavity. The geometry of the first and second cavities, and force of coupling thereof, are selected such that the whole formed by both coupled cavities has a first pair of polarization-degenerate modes, that are resonant with transitions between the state having two elementary excitations and the two degenerate states having one elementary excitation from the quantum emitter, and a second pair of polarization-degenerate modes that are resonant with transitions between the degenerate states, having one elementary excitation, and the ground state.

11 Claims, 5 Drawing Sheets

(56) References Cited

PUBLICATIONS

Benson et al., "Regulated and Entangled Photons from a Single Quantum Dot", Physical Review Letters, vol. 84, No. 11 (Mar. 13, 2000).*

Karl et al. ("Localized and Delocalized Modes in Coupled Optical Micropillar Cavities", Optics Express, vol. 15, No. 3, (Jun. 25, 2007).*

Stace, T.M., et al., "Entangled two-photon source using biexciton emission of an asymmetric quantum dot in a cavity," Physical Review B, vol. 67, No. 8, pp. 085317-1-085317-15, XP-002599441, (Feb. 15, 2003).

Benson, O., et al., "Regulated and Entangled Photons from a Single Quantum Dot," Physical Review Letters, vol. 84, No. 11, pp. 2513-2516, XP-002599807, (Mar. 13, 2000).

Bayer, M., et al., "Optical Modes in Photonic Molecules," Physical Review Letters, vol. 81, No. 12, pp. 2582-2585, XP-002599442, (Sep. 21, 1998).

Dousse, A., et al., "Controlled Light-Matter Coupling for a Single Quantum Dot Embedded in a Pillar Microcavity Using Far-Field Optical Lithography," Physical Review Letters, vol. 101, No. 26, pp. 267404-1-267404-4, XP-00259943, (Dec. 21, 2008).

Boriskina, S.V., "Control of Modes Coupling, Selection and Enhancement in Wavelength-Scale Optical Microcavity Structures: Applications to Microlasers and Biosensing," LFNIM, pp. 391-398, (Jun. 29-Jul. 2006).

Gerard, J.M., et al., "Enhanced Spontaneous Emission by Quantum Boxes in a Monolithic Optical Microcavity," Physical Review Letters, vol. 81, No. 5, pp. 1110-1113, XP-002599446, (Aug. 3, 1998).

Karl, M., et al., "Localized and delocalized modes in coupled optical micropillar cavities," Optics Express, vol. 15, No. 13, pp. 8191-8196, XP-002599444, (Jun. 14, 2007).

Kistner, C., et al., "Cavity Quantum Electrodynamics Effects in Electrically Driven High-Q Micropillar Cavities," Poster Session 3, P2, IEEE, pp. 239-240, (Aug. 2, 2008).

Boriskina, S.V., "Spectrally engineered photonic molecules as optical sensors with enhanced sensitivity: a proposal and numerical analysis," Journal of the Optical Society of America B, vol. 23, No. 8, pp. 1565-1573, XP-002599445, (Aug. 2006).

International Search Report Issued Apr. 1, 2011 in PCT/FR11/00021 Filed Jan. 14, 2011.

* cited by examiner

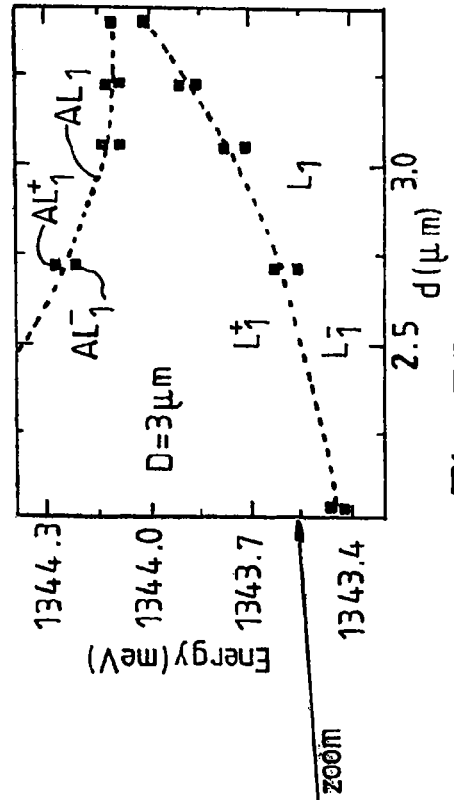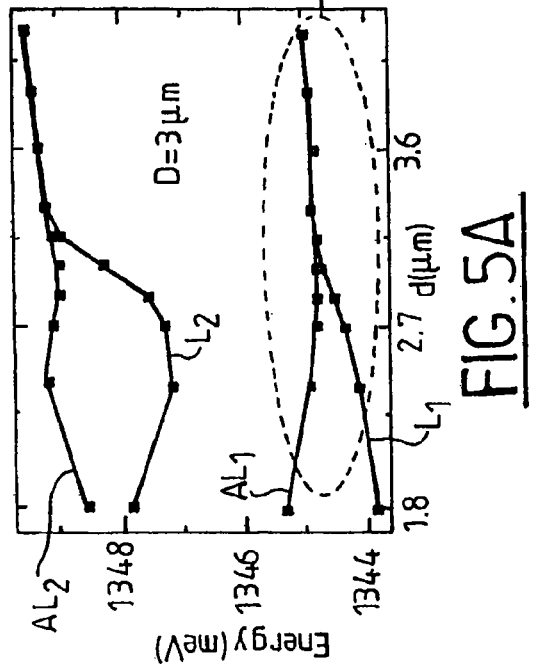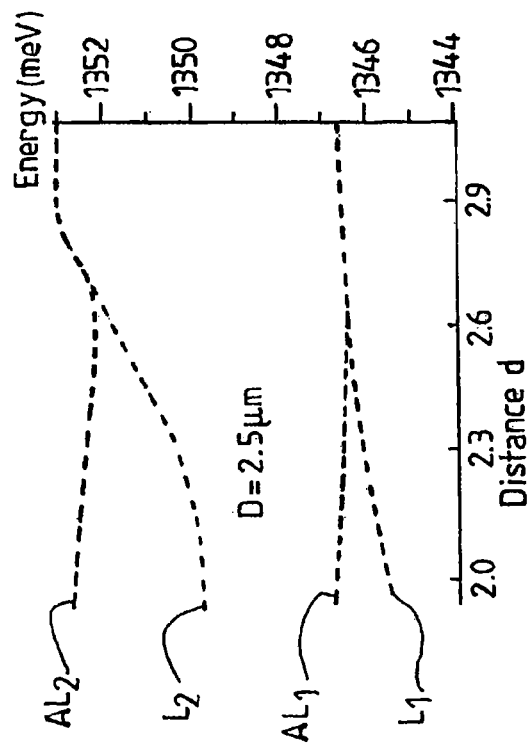

POLARIZATION-ENTANGLED PHOTON PAIR SOURCE AND METHOD FOR THE MANUFACTURE THEREOF

The invention relates to a source of pairs of photons that are entangled—and more particularly polarization-entangled—and to a method of fabricating the source. The invention applies in particular to the field of quantum cryptography, and more generally to that of quantum information.

Quantum cryptography is a technology that is expanding greatly, and that makes use of the laws of quantum mechanics to provide perfect confidentiality for communications by making it possible to detect that a transmitted message (and in particular an enciphering key) has been intercepted by making use of a communications protocol based on the use of isolated photons.

One of the main difficulties encountered in implementing practical quantum cryptography systems is managing line losses. It is not possible to amplify the transmitted signal without losing the security of the communication. To be able to transmit enciphering keys in secure manner over distances of several hundreds of kilometers, it is necessary to set up equipment known as "quantum relays", in which an essential component is a source of entangled photon pairs. Two photons are said to be entangled when they are described together by a quantum state that is not separable, i.e. that cannot be written in the form of a tensor product between two states each describing a single photon.

Ideally, a source of entangled photon pairs should emit one such pair—and only one—each time it receives an exciting pulse. Unfortunately, the sources that are presently available are very limited in data rate: for each exciting pulse there is a probability of only about 2% to 5% that a pair of entangled photons will actually be emitted and collected.

There are two main techniques for generating polarization-entangled photon pairs: parametric frequency conversion in a non-linear optical medium, and radiative cascade in a semiconductor quantum dot.

Parametric conversion is a non-linear optical effect: a photon at a frequency $\upsilon_1$ that is propagating in a medium presenting electric susceptibility that is second-order non-linear, can split into two frequency-entangled photons $\upsilon_2$ and $\upsilon_3$ where $\upsilon_2+\upsilon_3=\upsilon_1$. There is an intrinsic limit on the data rate of a source based on that effect, since the emitted light presents Poisson statistics. The probability of two photon pairs being emitted is proportional to the square of the probability of a single pair being emitted. It is therefore not possible to guarantee that the probability of emitting more than one pair of photons per pumping pulse is negligible unless the probability of emitting a single pair is low, typically about 5%. Thus only about 5% of the pumping pulses actually give rise to the emission of a pair of entangled photons.

In the radiative cascade that occurs in a quantum emitter such as a semiconductor quantum dot, a pair of entangled photons may be generated for each exciting pulse. Nevertheless, the photons are emitted isotropically in a medium having a high refractive index, which means that only a small fraction of them—about 2%—can be extracted.

The present invention seeks to enable a "high data rate" source to be made that emits one and only one pair of polarization-entangled photon on each exciting pulse, or at least does so with probability that is significantly greater than in the sources known in the prior art. In accordance with the invention, this object is achieved by increasing the efficiency with which photon pairs emitted by radiative cascade in a quantum emitter are extracted.

A first idea on which the invention is based is to place the generating quantum emitter in an optical cavity in order to facilitate the extraction of emitted photons by the Purcell effect. That technique is itself known, and is used in particular for making sources of isolated photons. However, without taking special precautions, it does not make it possible to preserve the entanglement between the photons of a given pair. A second idea on which the invention is based is to provide a second cavity that is coupled to the first. The coupling between the two cavities (a "photonic molecule") makes it possible to extract the photons that are generated efficiently without unfavorably affecting their entanglement.

In one aspect, the invention thus provides a polarization-entangled photon pair source including a quantum emitter, e.g. such as a quantum dot that presents a ground state, two states with single elementary excitation, which states are degenerate and of different spins, and a state with two elementary excitations; the source being characterized in that it also includes a first optical cavity in which said quantum emitter is inserted and a second optical cavity coupled with said first cavity; wherein the geometry of the first and second cavities, and the strength with which they are coupled, are selected in such a manner that the assembly constituted by the two coupled cavities presents a first pair of polarization-degenerate modes that are resonant with the transitions of the quantum emitter between the state with two elementary excitations and the two degenerate states with single elementary excitation, and a second pair of polarization-degenerate modes that are resonant with the transitions between said degenerate states with single elementary excitation and the ground state. Specifically, the parameters on which action can be taken to satisfy these conditions are typically the dimensions of the cavities (the diameter of microdisks or micropillars), and their relative distance apart. The cavities are generally placed side by side in the plane of the substrate in which they are made and/or in a plane perpendicular to the light emission direction. Preferably, they enable light to be confined in three dimensions.

The elementary excitations may be excitons (electron/hole pairs bound together by coulomb interaction), in which case there are said to be "excitonic" and "bi-excitonic" states.

Two quantum states or two modes are considered to be degenerate when their energy difference (which is never exactly zero) is less than their spectral width (which is always finite).

In various embodiments of the invention:

The modes of each of said pairs may present radiation patterns that overlap by 70% or more, and preferably by 80% or more. The percentage overlap is determined by calculating the scalar product of the normalized electric fields of the modes. In practice, overlap may reach 98% to 99% or even more.

The geometry of said optical cavities may be selected in such a manner as to cause the spontaneous emission of transitions between the state with two elementary excitations and the degenerate states with single elementary excitation, and also of transitions between said degenerate states with single excitation and the ground state, to be accelerated by the Purcell effect. In particular, said acceleration of spontaneous emission may be characterized by a ratio $F_p/(F_p+\gamma)\geq 0.5$ and preferably $F_p/(F_p+\gamma)\geq 0.75$, where $F_p$ is the Purcell factor of the optical mode of said transition, and $\gamma$ is the normalized spontaneous emission ratio of said transition into all the other optical modes.

For example, $F_p$ may be greater than or equal to 3, which leads to a satisfactory extraction rate (of about 75%) even when y is of the order of 1.

The geometry of the coupled cavities may be selected in such a manner that the Purcell factor for transitions between the degenerate states with single elementary excitation and the ground state is higher than the Purcell factor for transitions between the state with two elementary excitations and the two degenerate states with single elementary excitation. This may be obtained in particular by coupling together two cavities that present dimensions that are different.

Said coupled cavities may be selected from micropillar type cavities, microdisk type cavities, and photonic crystal cavities.

The source may also include electrical or optical pumping means for pumping said quantum emitter, and/or means for frequency tuning said cavities.

In another aspect, the invention also provides a method of fabricating an entangled photon pair source as described above, the method comprising the steps consisting in:

making a structure constituted by a first stack of dielectric layers forming a Bragg mirror; an active layer containing quantum emitters; and a second stack of dielectric layers forming a Bragg mirror;

depositing a layer of photosensitive resin on the surface of said structure;

scanning said surface with a first laser beam unsuitable for curing the resin, but suitable for stimulating the fluorescence of the quantum emitters of the active layer presenting desired electronic properties;

selecting those quantum emitters that present desired electronic properties on the basis of their fluorescence wavelength;

determining the position of at least one of said quantum emitters by measuring the fluorescence light emitted in response to the stimulation by said first laser beam; and curing the resin by means of a second laser beam so as to define regions for lithographic fabrication of said first and second cavities.

Other characteristics, details, and advantages of the invention appear on reading the following description made with reference to the accompanying drawings given by way of example and in which, respectively:

Figure 7:
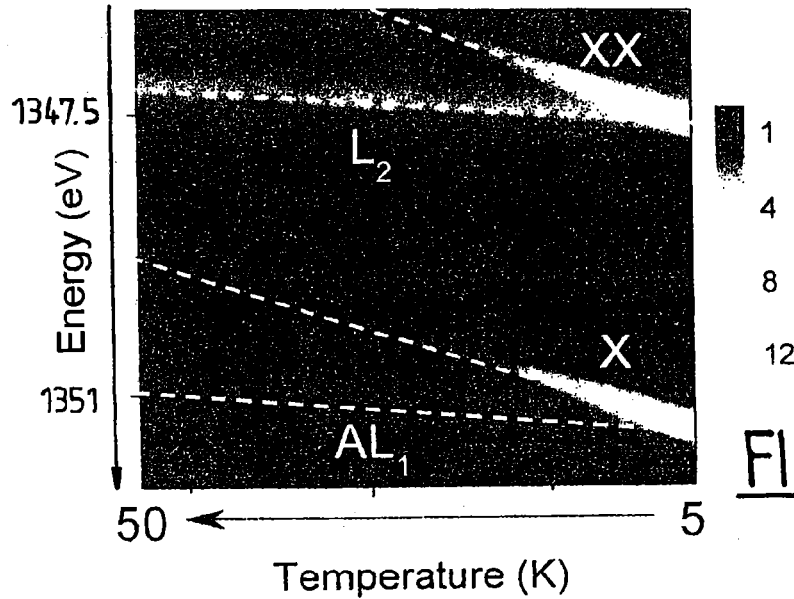
Figure 8B:
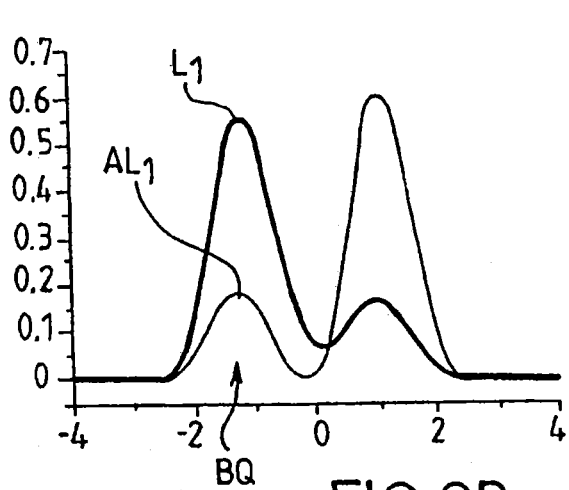
Figure 8A:
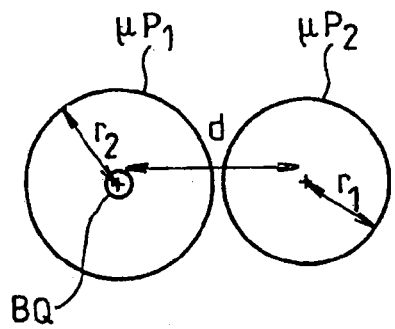
Figure 6:
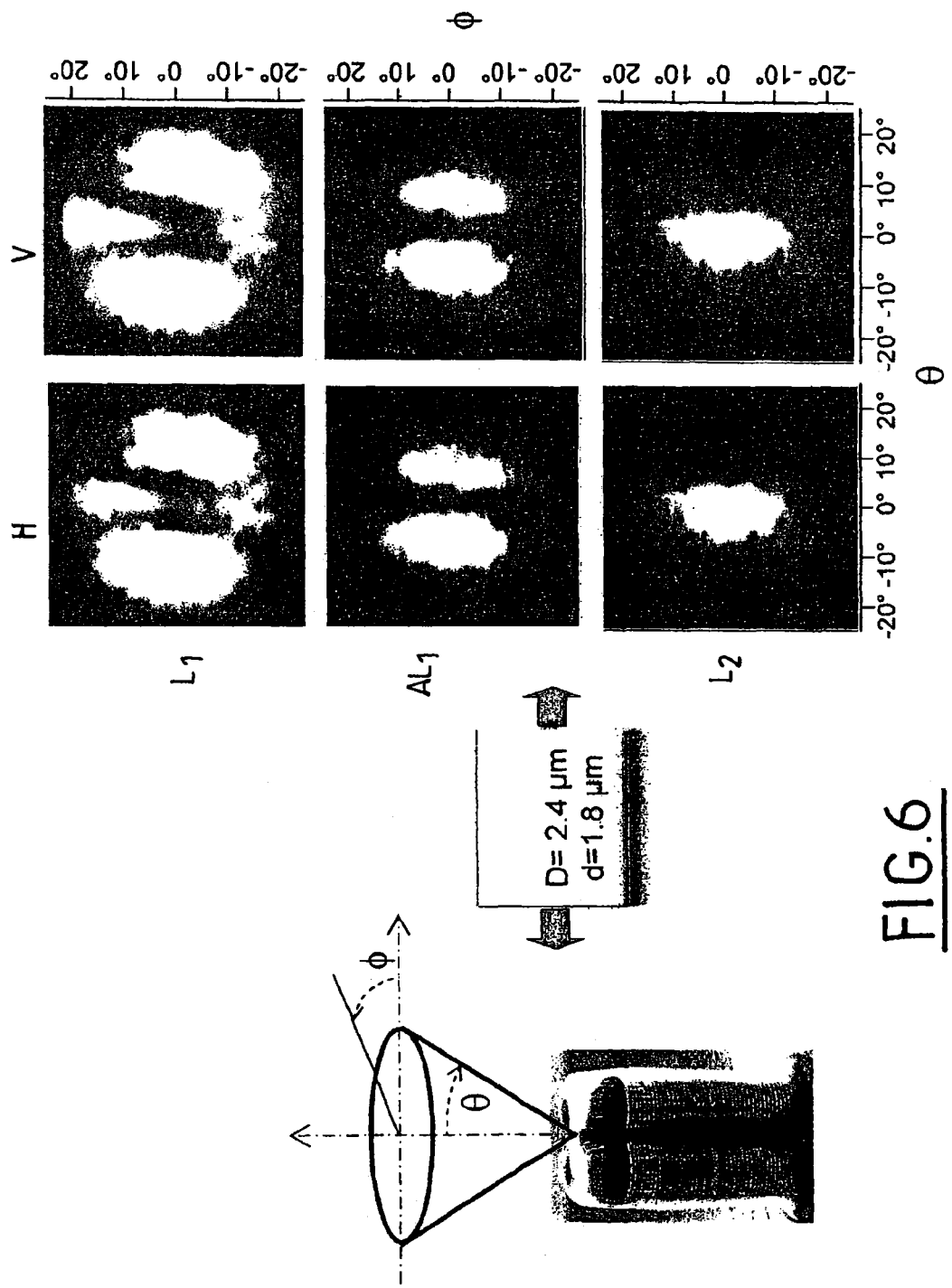
Figure 9:
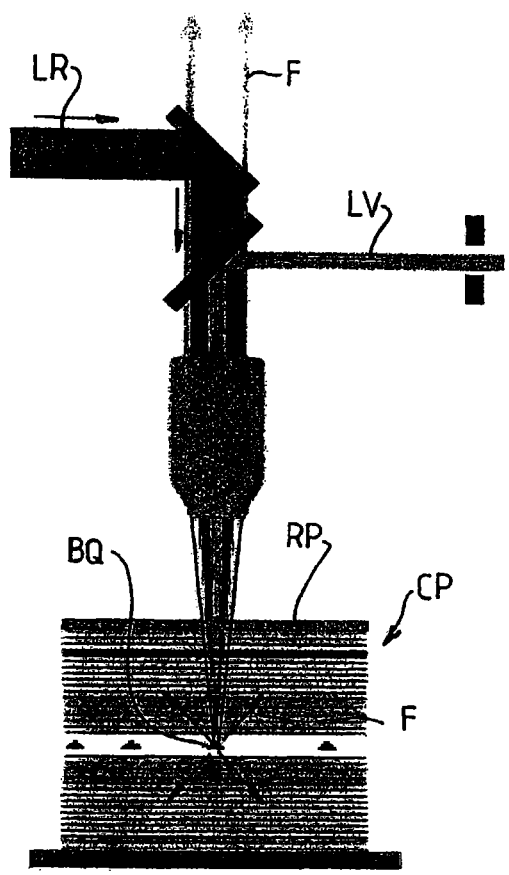

FIGS. 5A, 5B, and 5C are energy diagrams of modes in a "photonic molecule" as a function of the distance between the coupled optical cavities;

FIG. 6 shows images of photonic molecule radiation patterns;

FIG. 7 is a diagram illustrating a technique for frequency tuning a "photonic molecule";

FIGS. 8A and 8B show respectively an asymmetrical "photonic molecule" and the spatial distribution of light intensity for two modes of such a molecule; and FIG. 9 illustrates a method of fabricating the source of the invention.

Figure 1:
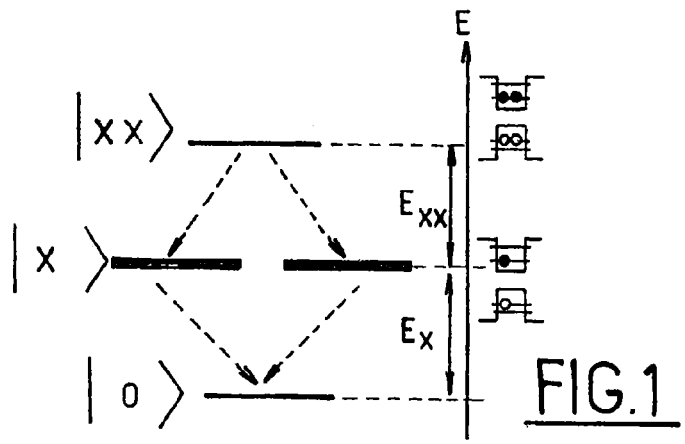
FIG. 1 is an energy state diagram of a quantum emitter—and more precisely of a quantum dot—suitable for use in implementing the invention.
Figure 2:
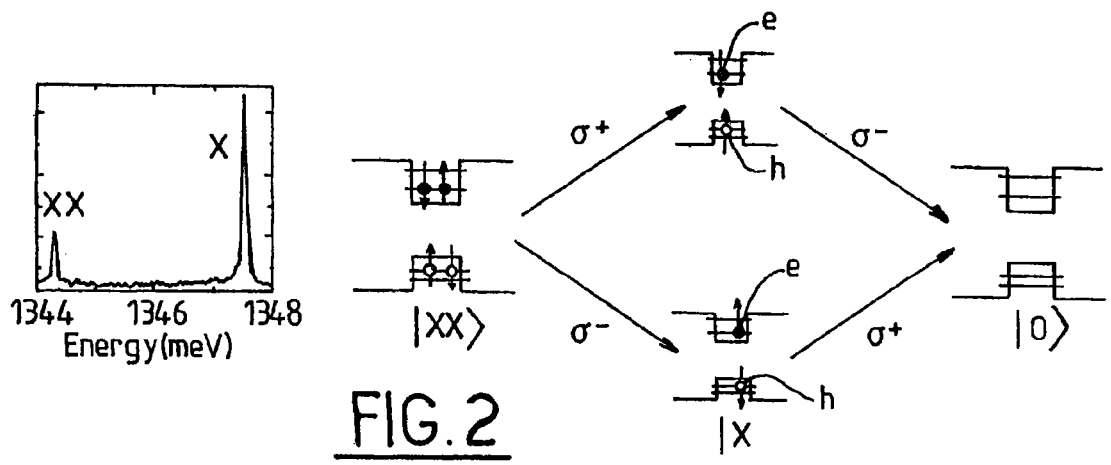
FIG. 2 shows the process of generating a pair of entangled photons in such a quantum dot.

A semiconductor quantum dot is an insertion of nanometric size of a material having a narrow forbidden band in a material having a wide forbidden band. A quantum dot is a trap for carriers in all three spatial dimensions such that the permitted energy states are discrete. In particular, if two electron-hole pairs are trapped in a quantum dot, two photons will be emitted in succession: those two photons are emitted at two different energies, $E_{XX}$ for the bi-exciton to exciton transition, and $E_X$ for the exciton to ground state transition, since the interaction between the carriers trapped within the quantum dot differs depending on whether two or four carriers are present (see the energy diagram of FIG. 1 and the emission spectrum on the left of FIG. 2). The state of the quantum dot occupied by two electron-hole pairs is referred to below as the bi-exciton state (XX), and that having only one pair as the exciton state (X).

The bi-exciton state XX is a state in which spin is not defined. In contrast, the exciton state X may present two different spin states: the spin of the electron (e) may be "up" while the spin of the hole (h) is "down", or vice versa. The transition from the bi-exciton state to a first exciton state is accompanied by the emission of a photon of energy that is circularly polarized to the right (σ+); thereafter the transition to the ground state is accompanied by the emission of a photon of energy $E_X$ that is circularly polarized to the left (σ−). Conversely, the transition from the bi-exciton state to the second exciton state is accompanied by the emission of a photon of energy circularly polarized to the left (σ−); and then the transition to the ground state is accompanied by the emission of a photon of energy $E_X$ that is polarized circularly to the right (σ+).

Depending on the geometrical properties of the quantum dot, the two exciton spin states may be degenerate or not. When degenerate (i.e. when the energy difference between the two states, although not zero, is less than a necessarily finite width), both possible recombination paths between the bi-exciton state XX and the ground state 0 are indiscernible and the emitted photons are polarization-entangled (see FIG. 2). When the energy difference between the two exciton states is greater than the transition width, then the emitted photons are polarization-correlated, but they are not entangled.

The emission of polarization-entangled photon pairs by radiation cascade in a semiconductor quantum dot was predicted by O. Benson et al.: "Regulated and entangled photons from a single quantum dot", Phys. Rev. Lett. 84, 2513 (2000), and by T. M. Stace et al., "Entangled two-photon source having bi-exciton emission of an asymmetric quantum dot in a cavity", Phys. Rev. B, 67, 085317 (2003), and was subsequently demonstrated experimentally by several groups, see for example R. M. Stevenson et al., "A semiconductor source of triggered entangled photon pairs", Nature 438, 179 (2006).

Like any "point-shaped" source, a quantum dot emits photons in quasi-isotropic manner. Furthermore, the quantum dot is inserted in an optical medium of relatively high refractive index (e.g. 3.5 for a GaAs matrix). Thus, because of total internal reflection at the air/semiconductor interface (respective indices 1 and 3.5), only about 6% of the photons emitted by the quantum dot actually leave the semiconductor, and fewer than 1% to 3% can be coupled effectively to an optical fiber.

The problem of extracting photons also arises when quantum dots are used as single quantum sources. In this field, this problem has been solved by making use of a phenomenon known as the "Purcell effect", and on this topic reference may be made to the article by E. Moreau et al. "Single mode solid-state photon source based on isolated quantum dots in pillar microcavities", Appl. Phys. Lett. 79, 2865 (2001), and also to the article by J. M. Gérard and B. Gayral "Strong Purcell effect for InAs quantum boxes in three-dimensional solid-state microcavities", J. Lightwave Technol. 17, 2089 (1999).

Figure 3:
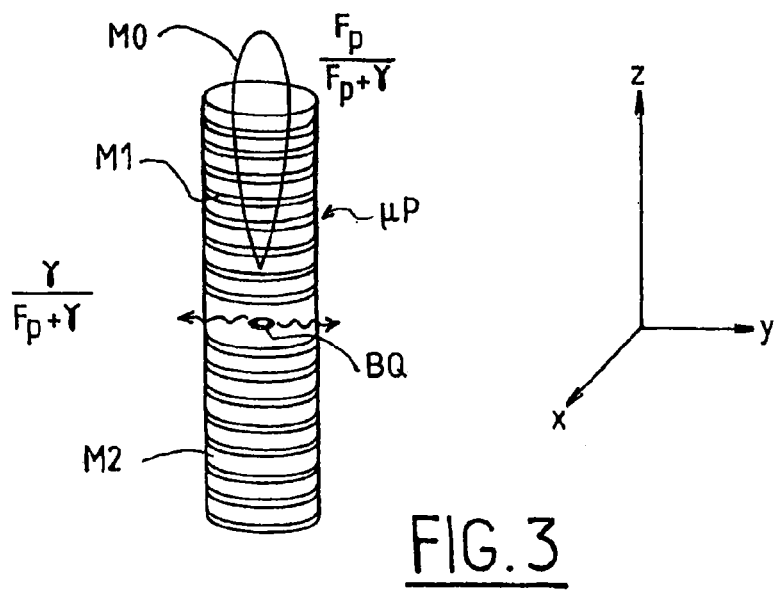
FIG. 3 shows a quantum dot coupled with an optical cavity of the "micropillar" type.

It is known that the spontaneous emission rate of an emitter depends on its electromagnetic environment. Thus, by placing an emitter in an optical cavity that confines the electromagnetic field, it is possible to accelerate its spontaneous emission by a factor $F_p$ referred to as the Purcell factor. In so doing, the emission from the emitter is redirected in the cavity mode and the emission fraction in the mode is $F_p/(F_p+\gamma)$, where $\gamma$ is the radiative recombination rate in the other modes of the structure, normalized on the emission rate in the solid semiconductor. Thus, with a factor $\gamma \approx 1$ and with a Purcell factor $F_p=5$, 83% of the photons can be collected, and more than 90% can be collected with a Purcell factor $F_p=10$. FIG. 3 shows this principle for a micropillar type cavity μP. In such a cavity, two "Bragg" or interference mirrors M1, M2 confine the field in the z direction. The index contrast between the material and air provides confinement in the other two directions (an optical fiber type guidance effect). A fraction $F_p/(F_p+\gamma)$ of the photons is emitted in the MO mode in the cavity, while the remaining fraction—equal to $\gamma/(F_p+\gamma)$—is emitted in the other modes.

For a quantum emitter inserted in a micropillar type optical cavity, the spontaneous emission rate $\gamma$ has a value close to 1. In order to obtain a high extraction rate, e.g. of the order of 75%, it is therefore necessary to have $F_p \geq 3$. Other cavities, e.g. photonic crystal cavities or micropillars with a metal-plated side surface, present factors $\gamma \ll 1$ (e.g. about 0.1). Under such circumstances, even a Purcell factor of abut 1 makes it possible to achieve very satisfactory extraction rates.

The article by O. Benson et al. raises the possibility of using the Purcell effect to encourage extraction of entangled photon pairs emitted by a quantum dot. Nevertheless, that is merely theoretical type work specifying a method of extracting a single photon and proposing that it be extended to pairs of entangled photons without taking account of the conditions that must be satisfied in order to extract such pairs while preserving entanglement. In reality, applying the Purcell effect extraction technique to generating entangled photon pairs comes up against a fundamental difficulty. When it is desired to use a quantum dot coupled to an optical cavity as a high efficiency source of single photons, it suffices to tune the cavity to the single XX→X transition, or to the single X→0 transition. In contrast, with entangled photon pairs, the cavity must be resonant for both transitions. In general, this cannot be achieved by acting on the sole parameter that is available in practice for tuning an optical cavity of microscopic dimensions that is suitable for being coupled to a quantum dot, i.e. its size.

There are also two additional conditions that need to be satisfied in order to avoid reducing the degree of polarization entanglement between the photons. Firstly, it is necessary for the modes of the cavity to be degenerate in polarization, since otherwise one of the two radiative recombination paths would be favored to the detriment of the other. Secondly, it is necessary for the same-wavelength but different-polarization modes of the cavity to present radiation patterns that are practically identical, so that no information about the radiative recombination path of the bi-exciton can be obtained by observing the radiation patterns. It is important to observe that degeneracy does not of itself imply that the radiation patterns can be superposed; on this topic, reference should be made to the article by M. Larque et al. "Optimized H1 cavities for the generation of entangled photon pairs", New Journal of Physics, 11 (2009) 033022.

Because of these constraints, it has until now been impossible to extract the polarization-entangled photon pairs that are generated by a quantum dot with satisfactory efficiency.

In the source of the invention, the entangled photons emitted by a quantum dot are extracted efficiently by a "photonic molecule", i.e. by a structure made up of two optical cavities that are coupled to each other and to the quantum dot, which cavities are preferably capable of confining light in three dimensions.

Figure 4A:
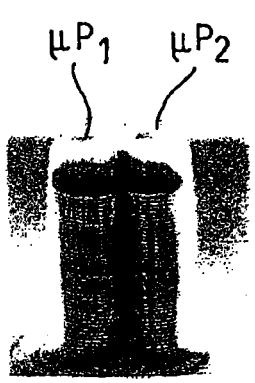
FIGS. 4A and 4B are an elevation view and a section view of a source in an embodiment of the invention, constituted by a quantum dot coupled to a "photonic molecule" formed by two identical optical cavities.
Figure 4B:
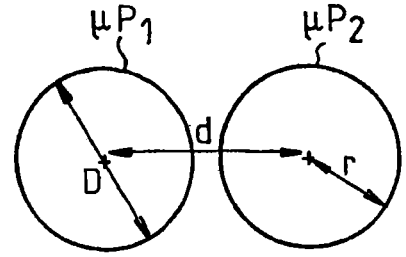

When two cavities are moved towards each other, their evanescent electromagnetic fields overlap in part. Coupling appears between the two cavities and new optical modes are defined. The sizes (diameter D, or in equivalent manner, radius r) of the individual cavities can then be selected in order to obtain a resonant wavelength that is intermediate between the two wavelengths of the bi-exciton to exciton and exciton to ground state transitions. The distance (d) between the two cavities then makes it possible to lift the degeneracy between the two coupled cavity modes and to adjust said modes to the energies $E_X$ and $E_{XX}$. FIG. 4A shows a scanning electron microscope image of a structure formed by two micropillar type cavities μP1 and μP2 (a "photonic molecule"). FIG. 4B shows—in highly diagrammatic manner—a section view of such a structure; it is assumed here that the two cavities are identical, even if that is not essential, as explained below.

In order to ensure that the cavities present degenerate modes in polarization, the present inventors have observed that the coupling can be obtained while maintaining coupled modes that are essentially non-polarized. Because of their circular symmetry, the micropillar type cavities, when taken individually, present modes that are degenerate in polarization. Because of the coupling, each mode of a cavity splits into two modes of different energies; however, and surprisingly, in spite of the manifest loss of symmetry, polarization degeneracy is substantially preserved (the energy difference between the modes that are polarized parallel or perpendicularly to the axis of the "molecule" remains very small compared with the resonance spectrum width of the modes). This property is essential for preserving the indiscernability of the two emitted photons.

FIGS. 5A to 5C show the energies (in millielectron volts (meV)) of the photonic modes measured on photonic molecules constituted by two GaAs/AlAs (mean refractive index 3.2) pillars having a diameter D=3 micrometers (μm) (FIG. 5A and its enlargement FIG. 5B), and D=2.5 μm (FIG. 5C) for various center-to-center distances d. For two pillars that are very far apart, the four optical modes are degenerate in wavelength and of circular polarization. As the pillars come closer together, the coupling between the two cavities lifts this degeneracy: the four modes are shared between two wavelengths (binding mode $L_1$ and anti-binding mode $AL_1$). For each of these wavelengths ($L_1$ or $AL_1$), the photonic molecule presents two energy modes (+ and −) that are very close together. In other words, the molecule presents a first pair of polarization degenerate modes ($L_1+$, $L_1-$), and a second pair of polarization-degenerate modes ($AL_1+$, $AL_1-$) of greater energy. Only for very strong coupling is polarization degeneracy lifted, and each mode presents linear polarization.

Throughout the range of intermediate coupling, where the energy difference between the modes $AL_1+$ and $AL_1-$ (or $L_1+$ and $L_1-$) is much less than the spectrum width of the modes, it is possible to adjust the sizes of the cavities and their center-to-center distance in order to tune the modes $AL_1$ and $L_1$ with the XX→X and X→0 transitions of a quantum dot.

The $AL_1$ and $L_1$ modes are then not polarized and they enable polarization-entangled photon pairs to be extracted efficiently.

In reality, each individual cavity presents a plurality of modes that are duplicated as a result of the coupling. Consequently, the photonic molecule also presents modes $L_2$ and $AL_2$ that result from duplicating the second mode of each micropillar, and so on. The parameters $\underline{d}$ and D of the photonic molecule may be selected in such a manner as to tune the $XX \to X$ and $X \to 0$ transitions with any two of these modes.

Furthermore, the $AL_1+/AL_1-$, $L_1+/L_1-$, and $L_2+/L_2-$ modes present radiation patterns that overlap by more than 95%, such that no information about the recombination path relating to the bi-exciton can be obtained by observing the radiation pattern. This is shown in FIG. 6; this figure shows images of the radiation patterns of the modes $AL_1$, $L_1$, and $L_2$ in H linear polarization (parallel to the axis of the molecule) and in V linear polarization (perpendicular to said axis); from the substantial identity between the radiation patterns of the linearly-polarized modes (H/V) it is possible to deduce the patterns of the circularly-polarized modes (+/−), which are linear combinations thereof. These are angle patterns: this means that the axes of the figures correspond to the angles θ and φ, as defined in the figure. These results correspond to D=2.4 μm and d=1.8 μm.

FIG. 7 is a diagram of the intensity of emission from a quantum dot coupled to a photonic molecule as a function of temperature. At 5K the $X \to 0$ and $XX \to X$ transitions are in resonance with the modes $L_2$ and $AL_1$ of the photonic molecule. This figure shows that the modes of the photonic molecule may be tuned with the transitions of the quantum dot by fine control of the temperature T. A strong increase in the intensity of the signal is observed when the $X \to 0$ and $XX \to X$ transitions are in resonance with the modes $L_2$ and $AL_1$. This increase of signal is the signature of the emission being redirected by the acceleration of spontaneous emission for both transitions of the quantum dot. The photon extraction rate is then given by $F_p/(F_p+1)$ since the spontaneous emission rate is of the same order as that for the solid material of this type of cavity ($\gamma \approx 1$).

FIG. 7 shows that the source under consideration in this example operates at cryogenic temperatures, below 70K. This limitation is inherent to using a quantum dot of the InAs/GaAs type emitting at 900 nanometers (nm). Nevertheless, the invention may be applied to any type of single quantum emitter in which a radiative cascade occurs. Such emitters are of the type that confines carriers in three dimensions. For example, nanocrystals of II-VI semiconductors are good candidates for making such sources operating at higher temperature.

In order to ensure that the small amount of duplication of spectrum lines in linear polarization $AL_1+$ and $AL_1-$ ($L_1+$ and $L_1-$; $L_2+$ and $L_2-$) does not have an influence on the degree of entanglement of the emitted photon pairs, the widths of the spectrum lines of the cavity modes are selected to be much greater than the energy difference of the modes $AL_1+$ and $AL_1-$ ($L_1+$ and $L_1-$; $L_2+$ and $L_2-$). For example, for two GaAs/AlAs pillars with D=3 μm, the energy difference between two different polarization modes is about 50 microelecton volts (μeV), while the width of each mode is about 400 μeV. The Purcell factor is about 5, thereby guaranteeing collection of about 80%.

In the example of FIG. 7, the $X \to 0$ transition is at higher energy than the $XX \to X$ transition. The principle of the invention remains the same under opposite conditions: the $AL_1$ mode is then resonant with the $X \to 0$ transition and the $L_2$ mode with the $XX \to X$ transition. More generally, all of the modes of the photonic molecule ($L_1$, $AL_1$, $L_2$, $AL_2$, . . . ) can be tuned with the two transitions $XX \to X$ and $X \to 0$.

The source of the invention may be optimized in various ways.

In order to achieve 80% extraction of photons towards the top of the structure, it is necessary for the reflectivity of the rear mirror to be selected to be greater than that of the top mirror. If both mirrors present the same reflectivity, only a fraction $F_p/2(F_p+\gamma)$ of photons is re-directed upwards.

The use of two cavities of different sizes may also be advantageous. When two identical cavities are used, as in the example considered above, the acceleration of spontaneous emission is the same for both transitions. Nevertheless, it may be advantageous to accelerate the spontaneous emission more strongly for the exciton than for the bi-exciton. Most quantum dots present a small lift of degeneracy of the exciton state that can be caused by a small amount of shape anisotropy or by the wave functions of the carriers in the quantum dot. If this degeneracy lifting is greater than the spectrum width of the transition, the emitted photon pairs are no longer entangled. One solution to the problem consists in widening the $X \to 0$ transition by accelerating spontaneous emission (see the above-mentioned article by T. M. Stace et al.). This is made possible by using an asymmetrical photonic molecule in which the cavity $\mu P_1$ containing the cavity is slightly greater than the other cavity $\mu P_2$ ($r_1$ greater than $r_2$ by about 2%). In this way, the electric field of the binding mode $L_1$, that is resonant with the exciton X, is more intense than that of the anti-binding mode $AL_1$, that is resonant with the bi-exciton XX. The Purcell effect is thus stronger for the $X \to 0$ transition, which is widened more than the $XX \to X$ transition. In contrast, the extraction rate for the two spectrum lines remains practically the same, since the rate depends weakly on $F_p$, providing $F_p \geq 4-5$. FIG. 8A shows a section view of such an asymmetrical photonic molecule, and FIG. 8B shows the spatial distribution of light intensity inside said molecule for the $AL_1$ and $L_1$ modes that are resonant with the $XX \to X$ and $X \to 0$ transitions respectively in this example.

If the $X \to 0$ transition has higher energy than the $XX \to X$ transition, the above-described principle continues to apply, this time by reducing the diameter of the pillar containing the quantum dot.

The use of temperature control for spectral tuning between the modes of the cavity and the spectrum lines $E_X$ and $E_{XX}$ is appropriate for demonstrating the principle; however in practical applications it is preferable to make use of the Stark effect, by applying an electric field along the z axis. Reference may be made on this topic to the article by A. Laucht et al. "Electrical control of spontaneous emission and strong coupling for a single quantum dot", New, J. Phys. 11, 023034 (2009).

The cavity may be pumped optically, by coupling with a pump light source such as a semiconductor laser. That technique has been used to validate the principle of the invention. For industrial applications, it appears to be preferable to have recourse to electrical pumping, by means of two electrodes placed at the ends of the micropillar cavity (the top electrode being in the form of a ring so as to allow photons to be extracted). Electrical pumping of a quantum dot situated inside a micropillar cavity has recently been demonstrated by C. Bockler et al., "Electrically-driven high-Q quantum dot micropillar cavities", Appl. Phys. Lett. 92, 091107 (2008).

The invention is described above with reference to a photonic molecule formed by coupling two micropillar cavities. That is not an essential limitation since other cavities may be used for implementing the invention; by way of example, mention may be made of cavities of the microdisk type or of the photonic crystal type. Two cavities of different types may optionally be used. The only constraint is that the cavities must present polarization-degenerate modes, and that the degeneracy should be little affected by the coupling, as happens with micropillars. From a technological point of view, it is important for the cavities to be arranged side by side, in the plane of the substrate from which they are made and/or in a plane perpendicular to the light-emission direction.

The fabrication of sources of the invention takes advantage of a technique that has recently been developed by a team to which the present inventors belong: see the article by A. Dousse et al. "Controlled light-matter coupling for a single quantum dot embedded in a pillar microcavity using far-field optical lithography", Phys. Rev. Lett. 101, 267404 (2008).

Firstly, as shown in the figure, a planar microcavity CP is made by molecular beam epitaxy, and it contains in its center a plane in which there is a random distribution of quantum dots BQ at a density of $10^8$ or $10^9$ dots per square centimeter ($cm^2$). The dimensions of the quantum dots present a statistical dispersion, so their emission wavelengths also present a statistical dispersion; nevertheless, the emission maximum of the non-uniform distribution of quantum dots is centered on the mode of the planar optical cavity. The surface of the sample is then protected in order to perform a fast high temperature thermal anneal. It has been shown that such anneals lead to reducing the degeneracy lifting of the states of the exciton: D. J. P. Ellis et al., "Control of fine-structure splitting of individual InAs quantum dots by rapid thermal annealing", Appl. Phys. Lett. 90, 011907 (2007). The annealing is selected in such a manner as to reduce this degeneracy lifting for all of the quantum dots.

The planar microcavity containing the quantum dots is coated in a layer of photosensitive resin RP and cooled to a low temperature (typically 10 K). A red laser LR, that is not suitable for curing the resin then scans its surface. The wavelength of this laser is selected so as to excite emission of the quantum dots by fluorescence (F); the wavelength of this emission makes it possible to identify and therefore to select quantum dots that present the desired energy properties. By detecting the emission maximum of each selected quantum dot, it is possible to identify its position with accuracy of the order of about 10 nm. A green second laser LV that propagates on the same axis as said red laser then serves to cure the resin at a given position relative to the single emitter. In order to make a photonic molecule, the resin is initially cured in a manner that is centered on the quantum dot, and then the sample is moved through the distance $\underline{d}$ in order to cure a second cavity. The parameters D and $\underline{d}$ are selected by measuring the energies of the X→0 and XX→X transitions. The sample is then raised to ambient temperature, and the resin is developed. Metal is deposited and then lifted off in order to etch the molecules. A large number of photonic molecules can thus be made in a single lithographic step, thereby making it possible to obtain a fabrication cost that is relatively low.

It should be observed that in accordance with this fabrication technique, the photonic molecule is made around the emitter (quantum dot), and as a function of the wavelengths of its two transitions. That would not be possible, or would be much more difficult, if the two cavities constituting the photonic molecule were superposed instead of being placed side by side.

Cooling to cryogenic temperature is necessary, at least in certain circumstances, in order to be able to observe the fluorescence of the quantum dots. Depending on the nature of said dots, the operation can be performed at a higher temperature.

The invention claimed is:

1. A polarization-entangled photon pair source comprising:
    a single quantum emitter that presents a ground state, two states with single elementary excitation, which states are degenerate and of different spins, and a state with two elementary excitations; and
    a photonic molecule comprising:
        a first optical cavity in which the single quantum emitter is inserted, and
        a second optical cavity coupled with the first cavity;
    wherein geometry of the first and second cavities and the distance between the first and second cavities are selected such that an assembly including the first and second coupled cavities presents a first pair of polarization-degenerate modes that are resonant with transitions of the quantum emitter between the state with two elementary excitations and the two degenerate states with single elementary excitation, a second pair of polarization-degenerate modes that are resonant with transitions between the degenerate states with single elementary excitation and the ground state, and the modes of each of the pairs present radiation patterns that overlap by 70% or more.

2. A polarization-entangled photon pair source according to claim 1, wherein the cavities are arranged side by side in a plane perpendicular to an emission direction of the light.

3. A polarization-entangled photon pair source according to claim 1, wherein the geometry of the optical cavities is selected to cause spontaneous emission of transitions between the state with two elementary excitations and the degenerate states with single elementary excitation, and of transitions between the degenerate states with single excitation and the ground state, to be accelerated by the Purcell effect.

4. A polarization-entangled photon pair source according to claim 3, wherein the spontaneous emission acceleration is characterized by a ratio $F_p/(F_p+\gamma) \geq 0.5$ or $F_p/(F_p+\gamma) \geq 0.75$, in which $F_p$ is the Purcell factor of the optical mode of the transition, and $\gamma$ is the normalized spontaneous emission ratio of the transition into all other optical modes.

5. A polarization-entangled photon pair source according to claim 3, wherein the geometry of the coupled cavities is selected such that the Purcell factor for transitions between the degenerate states with single elementary excitation and the ground state is higher than the Purcell factor for transitions between the state with two elementary excitations and the two degenerate states with single elementary excitation.

6. A polarization-entangled photon pair source according to claim 5, wherein the two coupled cavities present different dimensions.

7. A polarization-entangled photon pair source according to claim 1, wherein the coupled cavities are selected from micropillar type cavities, microdisk type cavities, and photonic crystal cavities.

8. A polarization-entangled photon pair source according to claim 1, further comprising electrical or optical pumping means for pumping the quantum emitter.

9. A polarization-entangled photon pair source according to claim 1, further comprising means for frequency tuning the cavities.

10. A method of fabricating a polarization-entangled photon pair source according to claim 1, the method comprising:
    making a structure including: a first stack of dielectric layers forming a Bragg mirror; an active layer containing quantum emitters; and a second stack of dielectric layers forming a Bragg mirror;

depositing a layer of photosensitive resin on a surface of the structure;

scanning the surface of the structure with a first laser beam unsuitable for curing the resin, but suitable for stimulating fluorescence of the quantum emitters;

selecting those quantum emitters that present desired electronic properties based on their fluorescence wavelength;

determining a position of at least one of the quantum emitters by measuring fluorescence light emitted in response to the stimulation by the first laser beam; and curing the resin by a second laser beam to define regions for lithographic fabrication of the first and second cavities.

11. A polarization-entangled photon pair source according to claim 1, wherein the modes of each of the pairs present radiation patterns that overlap by 80% or more.

* * * * *